United States Patent [19]
Danielsen

[11] 4,121,792
[45] Oct. 24, 1978

[54] ROLLER HARNESS ARRANGEMENT FOR AIRPLANE PILOT SEATS

[76] Inventor: Sverre Danielsen, Skoleveien 1, Sande, 4050 Sola, Norway

[21] Appl. No.: 873,480

[22] Filed: Jan. 30, 1978

Related U.S. Application Data

[63] Continuation of Ser. No. 764,905, Feb. 1, 1977, abandoned.

[30] Foreign Application Priority Data

Feb. 12, 1976 [NO] Norway ................................ 760458

[51] Int. Cl.² ........................................... B64D 25/06
[52] U.S. Cl. ......................... 244/122 B; 244/122 AG; 280/744; 297/388
[58] Field of Search ....... 244/122 B, 122 AG, 122 A, 244/122 R, 84; 180/82 C, 99; 280/744; 297/384, 385, 388

[56] References Cited

U.S. PATENT DOCUMENTS

| | | | |
|---|---|---|---|
| 3,219,297 | 11/1965 | Kenyon | 244/122 B |
| 3,222,015 | 12/1965 | Larsen et al. | 244/122 A |
| 3,312,430 | 4/1967 | Martin | 244/122 A |
| 3,329,464 | 7/1967 | Barwood et al. | 244/122 B |

*Primary Examiner*—Galen L. Barefoot
*Attorney, Agent, or Firm*—Cushman, Darby & Cushman

[57] ABSTRACT

A roller harness arrangement for airplane pilot seats arranged side by side. The roller mechanism for each pilot seat is, respectively coupled to a winding mechanism which is controllable by the pilot in the other pilot seat.

5 Claims, 1 Drawing Figure

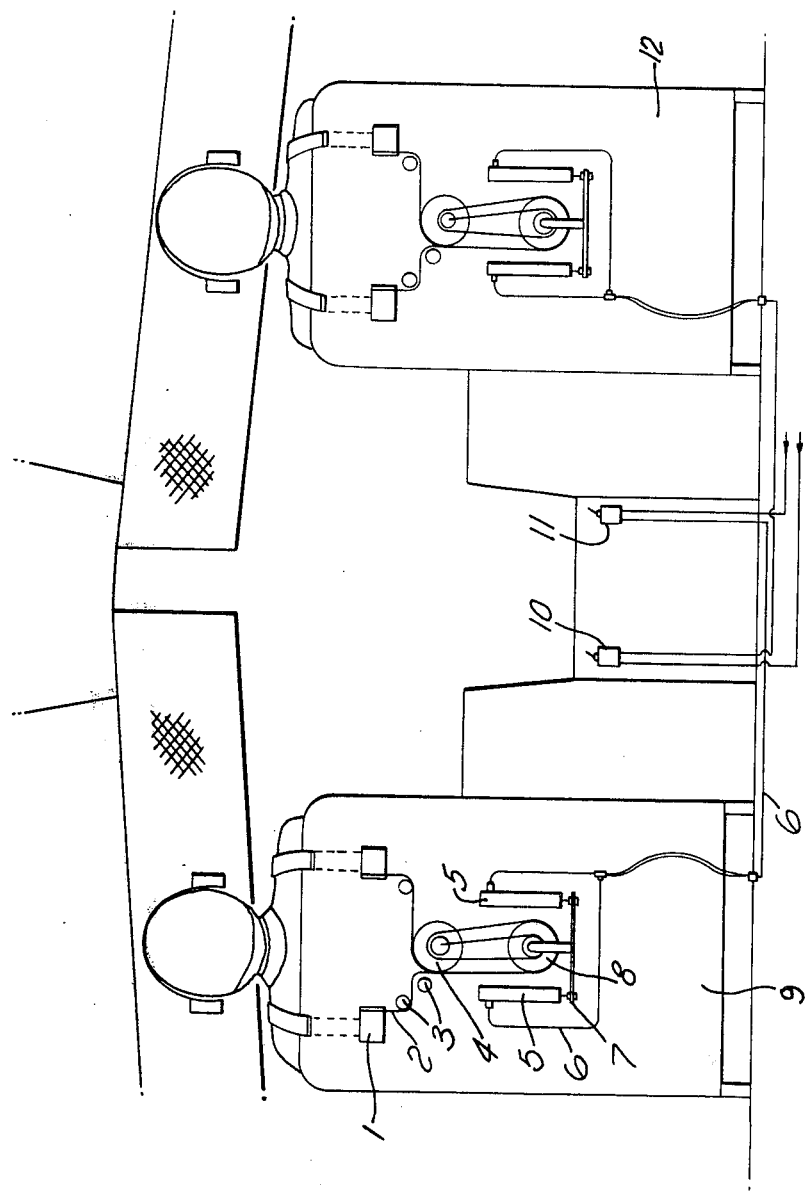

ROLLER HARNESS ARRANGEMENT FOR AIRPLANE PILOT SEATS

This is a continuation of application Ser. No. 764,905 filed Feb. 1, 1977, now abandoned.

The invention relates to a roller harness arrangement for airplane pilot seats arranged side by side.

Two airplane pilot seats are usually arranged side by side in the pilot cabin and roller harnesses are used so as the pilots may reach the instrument panels. Between each pilot seat and the instrument panels, is a steering column which by tumbling movement controls the elevation and side rudders and these columns are coupled in parallel. If one of the pilots should become indispositioned and drop forward over his steering column, and thereby press the airplane into dropping movement, it may be very difficult for the other pilot to restrain this by means of his column, and a catastrophe may happen.

The object of the invention is to make it possible for the other pilot without exercising the force necessary to move the first pilot from his steering column and without moving himself from his own seat, to free the column and thereby hinder the catastrophe.

This is according to the invention obtained in that the roller mechanism respectively mechanisms for the one pilot seat is, respectively are coupled to a winding mechanism which is controllable by the pilot in the other pilot seat.

Further features of the invention will appear from the claims 2 to 5.

An embodiment of the arrangement according to the invention will be described in detail below in connection with the drawing which schematically shows two pilot seats 9 and 12 seen from behind and equipped with an arrangement according to the invention.

The roller mechanism 1 for each harness is connected to one end of a wire 2 which over guide pulleys 3 is guided over a block sheave in a first block 8 in a tackle 4, 8, over a first block sheave in a second block 4 in the tackle, over a second block sheave in the first block 8, and is finally connected to the second block 4. The second block 4 is connected to the pilot seat, and the first block 8 is connected to the middle part of an arm 7, the ends of which being connected to the one end of each of two pressurized air cylinders 5, the other end of which is connected to the pilot seat. Through conduits 6 the two air cylinders are connected to not shown compressed air containers via control valves 11 and 10, respectively. In this way the pilot to the right in the drawing, may by operating the valve 11 wind the harnesses for the pilot to the left in the drawing and vice versa.

It is obvious that another source of compressed medium than a compressed air flask, namely the compressed air installation in the airplane itself or the hydraulic system in the airplane. Further, instead of the cylinders and tackle, electric motors with great gear ratio may be used.

Having described my invention, I claim:

1. In a harness arrangement for airplane pilot seats arranged side by side, each of said seats having fitted thereto a pilot harness which includes roller means for rolling up the respective harness, the improvement which comprises a system which enables each of two pilots to wind up the other pilot's harness so that the other pilot will be moved away from the aircraft controls, said system comprising a winding mechanism for each roller means operable to wind up the respective roller means so as to wind up the respective harness and thereby move the respective pilot away from the airplane controls and control means operable by a pilot in either seat for controlling the winding mechanism for the other seat.

2. A harness arrangement as in claim 1 wherein each winding mechanism includes a power-operated driving means connected to the respective roller means and wherein said control means includes means for supplying energy from a source to each driving means.

3. A harness arrangement as in claim 2 wherein each driving means includes a tackle assembly connected between the respective roller means and a piston and cylinder unit and wherein said control means includes valve means for directing fluid pressure from a pressure source to the cylinder units.

4. A harness arrangement as in claim 3 wherein the piston and cylinder units are air-operated.

5. A harness arrangement as in claim 3 wherein each tackle assembly includes a first block connected to the respective pilot seat and a second block connected to one end of the respective piston and cylinder unit, the other end of said unit being connected to said seat.

* * * * *